United States Patent [19]

Apellaniz

[11] 4,071,157
[45] Jan. 31, 1978

[54] SAFETY STOPPERING DEVICE

[75] Inventor: Ramon Apellaniz, Lasne-Chapelle-Saint-Lambert, Belgium

[73] Assignee: Euracom S.A., Brussels, Belgium

[21] Appl. No.: 777,444

[22] Filed: Mar. 14, 1977

[30] Foreign Application Priority Data

Apr. 14, 1976 France .................................. 76 1106

[51] Int. Cl.² ........................................... B65D 41/34
[52] U.S. Cl. ................................... 215/252; 220/214; 220/319
[58] Field of Search .............. 215/250, 251, 252, 253; 220/214, 315, 316, 317, 318, 319

[56] References Cited

U.S. PATENT DOCUMENTS

| 2,255,570 | 9/1941 | Rehfeld | 215/251 |
| 3,504,818 | 4/1970 | Crisci | 215/252 |
| 3,967,745 | 7/1976 | Julian | 215/252 |

FOREIGN PATENT DOCUMENTS

| 1,536,459 | 8/1968 | France | 215/252 |
| 414,377 | 12/1966 | Switzerland | 215/252 |

Primary Examiner—Ro E. Hart
Attorney, Agent, or Firm—Bacon & Thomas

[57] ABSTRACT

The invention pertains to a tamper-proof device for containers made of plastic materials provided with a threaded collar intended for fitting a screw cap, characterized by the fact that it comprises a rupturable platelet intended to be fitted between the container and the cap, around the collar, said platelet comprising at least one locking tooth for the purpose of being engaged by at least one tooth borne for this purpose by aforesaid cap.

6 Claims, 8 Drawing Figures

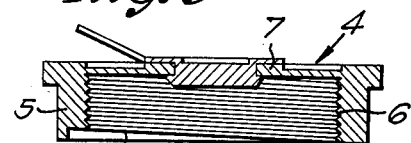
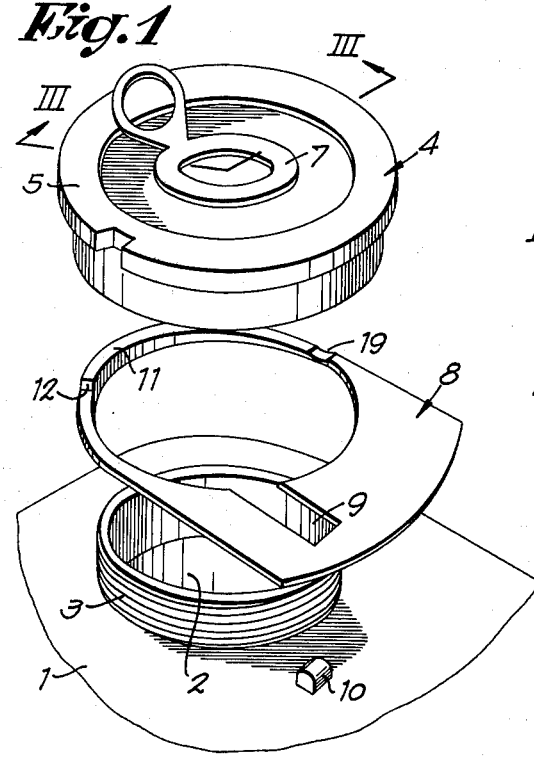
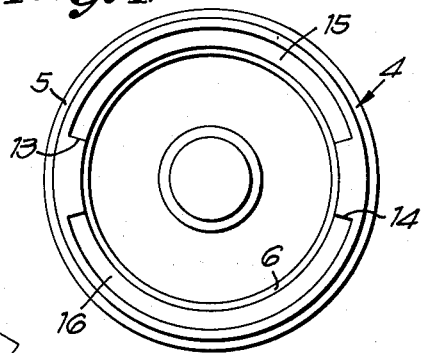
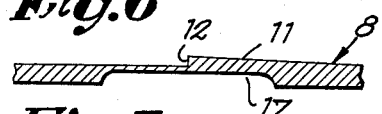
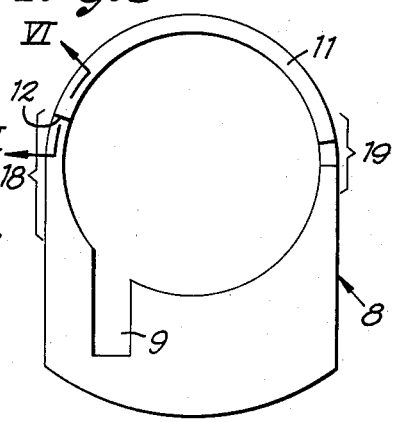
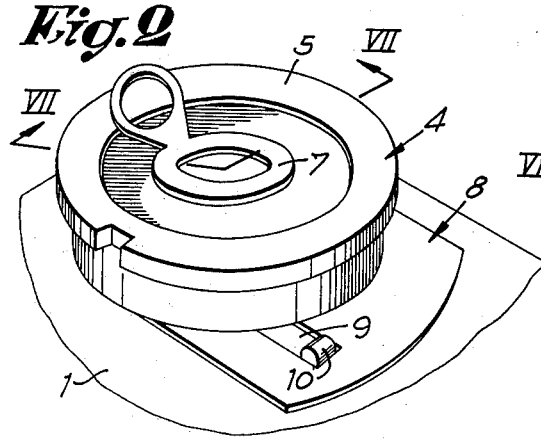
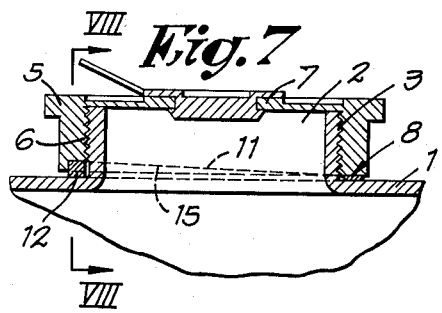
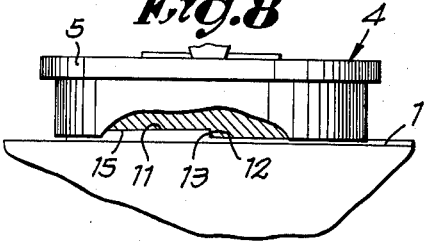

SAFETY STOPPERING DEVICE

The present invention pertains to a tamper-proof device intended more particularly, but not exclusively, for containers made of plastic materials for drinks and subject to deposit.

In such cases it is most important to discourage the users to put these containers to other use than the sole serving of the drinks they contain. It may indeed happen that private individuals may use these containers to hold harmful or dangerous products, before returning them to the bottler.

In order to discourage such practices, the invention suggests a tamper-proof device which provides a visual proof of any unauthorized opening of the container. If such is established, the deposit money would not be returned to the user and the container would not be re-entered into the distributing cycle.

The device according to the invention, for plastic containers provided with a threaded collar for the purpose of receiving a screw cap, comprises a rupturable platelet to be fitted between the container and the cap, around the collar, whereby this platelet is provided with at least one locking tooth for the purpose of being engaged by at least one tooth provided to this effect in aforesaid cap.

For clearness' sake, a form of embodiment according to the invention will be described hereinafter in greater detail, with reference to the appended drawings in which:

FIG. 1 is an exploded view of a device according to the invention;

FIG. 2 shows an assembled view of the device of FIG. 1;

FIG. 3 is a partial section, according to line III—III in FIG. 1;

FIG. 4 is a view according to arrow F4 in FIG. 3;

FIG. 5 is a top view of the safety platelet which can be seen in FIGS. 1 and 2;

FIG. 6 is a section, to a larger scale, according to line VI—VI in FIG. 2; and

FIG. 7 is a section according to line VII—VII in FIG. 2.

FIG. 8 is a section according to line VIII—VIII in FIG. 7.

The equipped container has a wall 1 provided with a filling opening 2 surrounded by an externally threaded collar 3.

Upon this collar, a cap 4 comprising a skirt 5 can be screwed by means of an internal screw thread 6. This cap is centrally provided with a passage, closed by a removable plug 7, for the fitting of a drawing-off device on the container.

A safety platelet 8 is fitted on wall 1, around collar 3, before screwing on the cap.

This platelet boasts a general annular shape. It is provided with a cut away portion 9 intended for receiving a protrusion 10, provided for this purpose on wall 1, and such in order to fix the platelet 8 in its assigned position.

On its upper annular surface, the platelet boasts a tooth formed by an inclined surface 11 and a sudden drop 12. As soon as the platelet is located on the container, inclined surface 11 rises in the sense of the screwing of the cap. In the example shown, the cap in this case boasts a left hand thread for safety reasons.

The lower internal part of skirt 5 of the cap is shaped so as to offer two diametrically opposite teeth, respectively 13 and 14, to which lead up inclined surfaces, respectively 15 and 16, the gradient of which corresponds to that of aforesaid inclined surface 11.

When cap 4 is screwed on collar 3, after fitting platelet 8, one or other of the teeth 13 and 14 will locate itself beyond tooth 12 after having pressed the latter down, which is made possible by the hollowed out part 17 provided for this purpose in the bottom surface of platelet 8.

Any subsequent attempt to unscrew cap 4 will unavoidably cause the rupture of platelet 8 in the areas of the latter shown at 18 and 19 in FIG. 5, areas possibly provided with local weak spots.

It is quite evident that numerous alterations can be brought about to this example of form of embodiment, without going beyond the scope of the invention such as defined in the following claims.

What I claim is:

1. Tamper-proof device for containers made of plastic materials provided with a threaded collar intended for fitting a screw cap, characterized by the fact that it comprises a rupturable platelet intended to be fitted between the container and the cap, around the collar, said platelet comprising at least one locking tooth for the purpose of being engaged by at least one tooth borne for this purpose by aforesaid stopper.

2. Device according to claim 1, characterized by the fact that aforesaid platelet is maintained in its assigned position by a protrusion provided for this purpose on the container, this protrusion being engaged in a corresponding cut away portion of aforesaid platelet.

3. Device according to claim 1, characterized by the fact that aforesaid platelet boasts a general annular shape.

4. Device according to claim 1, characterized by the fact that aforesaid tooth of the platelet comprises a slanting surface and an abrupt surface, aforesaid slanting surface extending in the screwing sense of the cap and in the plane of the platelet, right up to the abrupt drop.

5. Device according to claim 1, characterized by the fact that the cap boasts two diametrically opposite teeth on the bottom inside part of the skirt of aforesaid cap.

6. Device according to claim 1, characterized by the fact that the tooth of aforesaid cap engages the tooth of aforesaid platelet at the end of the screwing on of the cap on the collar, after temporarily pressing down the tooth of the platelet, the latter being provided for this purpose with a hollowed out part in its bottom surface, just under aforesaid tooth.

* * * * *